(12) United States Patent
Wang et al.

(10) Patent No.: US 11,416,005 B2
(45) Date of Patent: Aug. 16, 2022

(54) METHOD AND APPARATUS FOR CONTROLLING UNMANNED VEHICLE TO PERFORM ROUTE VERIFICATION

(71) Applicant: Baidu Online Network Technology (Beijing) Co., Ltd., Beijing (CN)

(72) Inventors: Yue Wang, Beijing (CN); Zelin Wu, Beijing (CN); Jingjing Xue, Beijing (CN); Yingnan Liu, Beijing (CN); Wenlong Rao, Beijing (CN); Zijie Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 273 days.

(21) Appl. No.: 16/664,321

(22) Filed: Oct. 25, 2019

(65) Prior Publication Data

US 2020/0150681 A1 May 14, 2020

(30) Foreign Application Priority Data

Nov. 13, 2018 (CN) .......................... 201811346265.1

(51) Int. Cl.
*G05D 1/02* (2020.01)
*G07C 5/02* (2006.01)
(Continued)

(52) U.S. Cl.
CPC ......... *G05D 1/0276* (2013.01); *G05D 1/0212* (2013.01); *G07C 5/02* (2013.01);
(Continued)

(58) Field of Classification Search
CPC .............. G05D 1/0276; G05D 1/0212; G05D 2201/0213; G05D 1/0246; G05D 1/0274;
(Continued)

(56) References Cited

U.S. PATENT DOCUMENTS 9,465,582 B1 * 10/2016 Whelan ................. H04L 9/3236
2015/0142248 A1 5/2015 Han et al.
(Continued)

FOREIGN PATENT DOCUMENTS

CN 105741595 A 7/2016
CN 105788330 A 7/2016
(Continued)

*Primary Examiner* — Rodney A Butler
(74) *Attorney, Agent, or Firm* — Nixon Peabody LLP (57) ABSTRACT

A method and apparatus for controlling an unmanned vehicle to perform route verification are disclosed. A method may include: receiving to-be-verified route information sent by a cloud server in communication connection, the to-be-verified route information including road information and expected traveling state information corresponding to a road section on a road characterized by the road information, and the expected traveling state information being used to characterize an expected traveling state of the unmanned vehicle on the corresponding road section; and performing following verification according to a set period during driving of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information.

6 Claims, 3 Drawing Sheets

(51) Int. Cl.
*G07C 5/08* (2006.01)
*H04L 67/10* (2022.01)

(52) U.S. Cl.
CPC ..... *G07C 5/085* (2013.01); *G05D 2201/0213* (2013.01); *H04L 67/10* (2013.01)

(58) Field of Classification Search
CPC .. G05D 1/0282; G05D 1/0088; G05D 1/0268; G07C 5/02; G07C 5/085; G07C 5/008; G07C 5/0808; H04L 67/10; H04L 67/18; H04L 67/125; G05B 23/0213; G05B 2219/24065
See application file for complete search history.

(56) References Cited

U.S. PATENT DOCUMENTS

| | | | |
|---|---|---|---|
| 2015/0228125 A1* | 8/2015 | Silva | G07B 15/063 705/13 |
| 2016/0138924 A1 | 5/2016 | An | |
| 2018/0266834 A1 | 9/2018 | Cronin | |

FOREIGN PATENT DOCUMENTS

| | | | |
|---|---|---|---|
| CN | 108280992 A | | 7/2018 |
| CN | 108490163 A | | 9/2018 |
| CN | 108615385 A | | 10/2018 |
| CN | 108615388 A | | 10/2018 |
| JP | 2005115883 A | | 4/2005 |
| JP | 2018097528 A | | 6/2018 |

* cited by examiner

METHOD AND APPARATUS FOR CONTROLLING UNMANNED VEHICLE TO PERFORM ROUTE VERIFICATION

CROSS-REFERENCE TO RELATED APPLICATIONS

This application claims priority to Chinese Patent Application No. 201811346265.1, filed on Nov. 13, 2018, titled "Method and apparatus for controlling unmanned vehicle to perform route verification," which is hereby incorporated by reference in its entirety.

TECHNICAL FIELD

Embodiments of the present disclosure relate to the field of computer technology, and specifically to a method and apparatus for controlling an unmanned vehicle to perform route verification.

BACKGROUND

An unmanned vehicle is a smart vehicle that senses the road environment through a vehicle-mounted sensing system, automatically plans a driving route, and controls the vehicle to reach a predetermined destination. During traveling, the unmanned vehicle usually plans the route based on an electronic map and then travels following the planned route.

In the related art, since road conditions described in the electronic map often deviate from actual road conditions, the operational reliability of the unmanned vehicle traveling in accordance with the planned route is reduced.

SUMMARY

Embodiments of the present disclosure propose a method and apparatus for controlling an unmanned vehicle to perform route verification.

In a first aspect, an embodiment of the present disclosure provide a method for controlling an unmanned vehicle to perform route verification, including: receiving to-be-verified route information sent by a cloud server in communication connection, the to-be-verified route information including road information and expected traveling state information corresponding to a road section on a road characterized by the road information, and the expected traveling state information being used to characterize an expected traveling state of the unmanned vehicle on the corresponding road section; and performing the following verification according to a set period during traveling of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information.

In some embodiments, the determining a verification result of the to-be-verified route information, based on a matching relationship between the detected traveling state and an expected traveling state corresponding to a road section of a current location in the to-be-verified route information includes at least one of the following: determining, in response to determining that the detected traveling state matches the expected traveling state corresponding to the road section of the current location, the to-be-verified route information being accurate; or determining, in response to determining that the detected traveling state does not match the expected traveling state corresponding to the road section of the current location, the to-be-verified route information being inaccurate.

In some embodiments, after the determining the to-be-verified route information being inaccurate, the method further includes: determining scene information of the current location; and storing the scene information in a scene information set.

In some embodiments, the method further includes: sending the scene information set to the cloud server, to cause the cloud server to modify the to-be-verified route information based on the scene information set.

In some embodiments, the scene information includes at least one of the following: current time information, current location information, or current scene image information.

In some embodiments, the expected traveling state includes at least one of the following: a uniform speed advance, an acceleration advance, a deceleration advance, or a stop.

In a second aspect, the embodiments of the present disclosure provide an apparatus for controlling an unmanned vehicle to perform route verification, including: an information receiving unit, configured to receive to-be-verified route information sent by a cloud server in communication connection, the to-be-verified route information including road information and expected traveling state information corresponding to a road section on a road characterized by the road information, and the expected traveling state information being used to characterize an expected traveling state of the unmanned vehicle on the corresponding road section; and an information verification unit, configured to perform the following verification according to a set period during traveling of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information.

In some embodiments, the determining a verification result of the to-be-verified route information, based on a matching relationship between the detected traveling state and an expected traveling state corresponding to a road section of a current location in the to-be-verified route information includes at least one of the following: determining, in response to determining that the detected traveling state matches the expected traveling state corresponding to the road section of the current location, the to-be-verified route information being accurate; or determining, in response to determining that the detected traveling state does not match the expected traveling state corresponding to the road section of the current location, the to-be-verified route information being inaccurate.

In some embodiments, after the determining the to-be-verified route information being inaccurate, the verification further includes: determining scene information of the current location; and storing the scene information in a scene information set.

In some embodiments, the apparatus further includes: an information sending unit, configured to send the scene information set to the cloud server, to cause the cloud server to modify the to-be-verified route information based on the scene information set.

In some embodiments, the scene information includes at least one of the following: current time information, current location information, or current scene image information.

In some embodiments, the expected traveling state includes at least one of the following: a uniform speed advance, an acceleration advance, a deceleration advance, or a stop.

In a third aspect, the embodiments of the present disclosure provide an electronic device, including: one or more processors; a storage apparatus, storing one or more programs thereon; and the one or more programs, when executed by the one or more processors, cause the one or more processors to implement the method according to any one of the implementations in the first aspect.

In a fourth aspect, the embodiments of the present disclosure provide an unmanned vehicle including the electronic device as described in the third aspect.

In a fifth aspect, the embodiments of the present disclosure provide a computer readable storage medium, storing a computer program thereon, the program, when executed by a processor, implements the method according to any one of the implementations in the first aspect.

The method and apparatus for controlling an unmanned vehicle to perform route verification provided by the embodiments of the present disclosure may receive to-be-verified route information sent by a cloud server in communication connection. Then, during traveling of the unmanned vehicle along the road, the following verification steps are performed according to a set period: detecting a traveling state of the unmanned vehicle; and determining a verification result of the to-be-verified route information, based on a matching relationship between the detected traveling state and an expected traveling state corresponding to the road section of the current location in the to-be-verified route information. The method and apparatus of the present embodiment detect the traveling state of the unmanned vehicle during traveling along the road according to the set period, and determine whether the to-be-verified route information is accurate by analyzing the matching relationship between the detected traveling state and the expected traveling state, improving the flexibility of verifying the accuracy of the to-be-verified route information.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
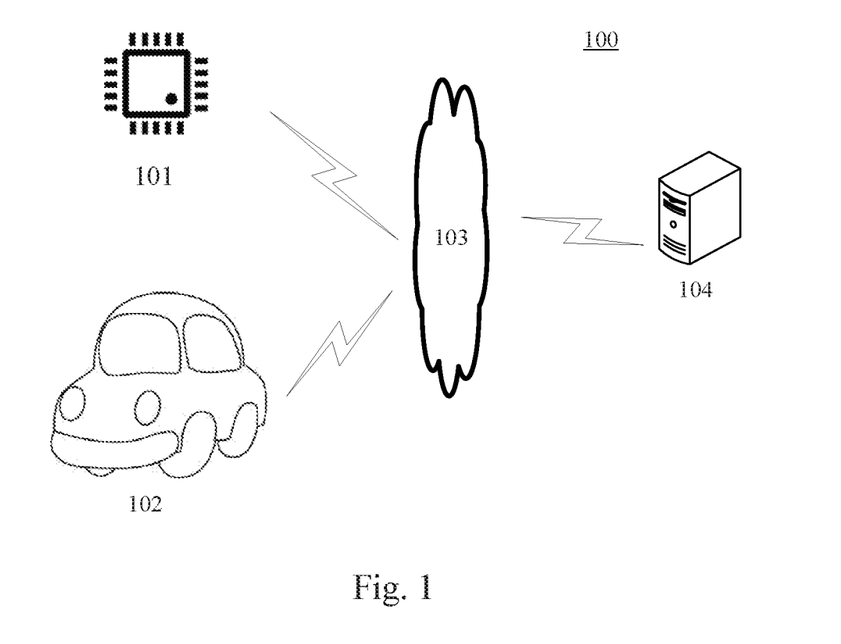
FIG. 1 is an exemplary system architecture diagram to which embodiments of the present disclosure may be applied.

FIG. 1 illustrates an exemplary system architecture 100 of a method for controlling an unmanned vehicle to perform route verification or an apparatus for controlling an unmanned vehicle to perform route verification to which the embodiments of the present disclosure may be applied.

As shown in FIG. 1, the system architecture 100 may include a control apparatus 101, an unmanned vehicle 102, a network 103, and a server 104. The network 103 is used to provide a communication link medium between the control apparatus 101, the unmanned vehicle 102 and the server 104. The network 103 may include various types of connections, such as wired, wireless communication links, or optic fibers.

The control apparatus 101 and the unmanned vehicle 102 may interact with the server 104 through the network 103, to receive or send messages and the like. Various communication client applications, such as instant messaging tools, or mailbox clients may be installed on the unmanned vehicle 102.

The control apparatus 101 and the unmanned vehicle 102 may be hardware or software. When the unmanned vehicle 102 is hardware, it may be an unmanned vehicle capable of achieving automatic driving. When the control apparatus 101 is hardware, it may be a processor possessing computing capability. The processor may control the unmanned vehicle 102. It should be noted that the control apparatus 101 may be integrated in the unmanned vehicle 102 or may exist separately from the unmanned vehicle 102.

When the control apparatus 101 and the unmanned vehicle 102 are software, they may be installed in the above-listed processor and unmanned vehicle, respectively. They may be implemented as a plurality of pieces of software or a plurality of software modules (for example, software or software modules for providing distributed services) or as a single piece of software or a single software module, which is not specifically limited herein.

The server 104 may be a server that provides various services, such as a cloud server that sends to-be-verified route information to the control apparatus 101. The cloud server may send formulated to-be-verified route information to the control apparatus 101 for accuracy verification.

It should be noted that the server may be hardware or software. When the server is hardware, the server may be implemented as a distributed server cluster composed of a plurality of servers, or as a single server. When the server is software, the server may be implemented as a plurality of pieces of software or a plurality of software modules (for example, software or software modules for providing distributed services) or as a single piece of software or a single software module, which is not specifically limited herein.

It should be noted that the method for controlling an unmanned vehicle to perform route verification provided by the embodiments of the present disclosure is generally performed by the control apparatus 101, accordingly, the apparatus for controlling an unmanned vehicle to perform route verification is generally disposed in the control apparatus 101.

It should be understood that the number of control apparatuses, unmanned vehicles, networks and servers in FIG. 1 is merely illustrative. Depending on the implementation needs, there may be any number of control apparatuses, unmanned vehicles, networks and servers.

Figure 2:
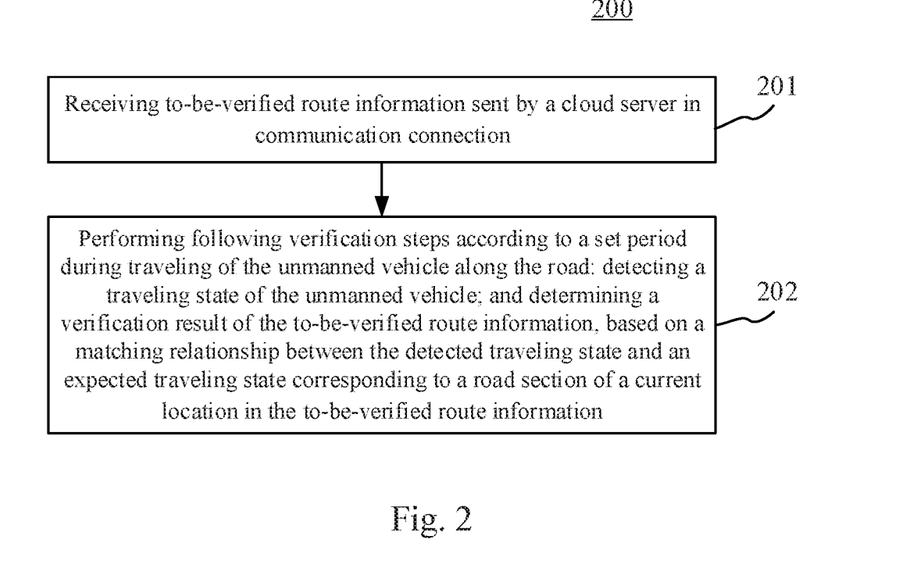
FIG. 2 is a flowchart of a method for controlling an unmanned vehicle to perform route verification according to an embodiment of the present disclosure.

With further reference to FIG. 2, a flow 200 of an embodiment of a method for controlling an unmanned vehicle to perform route verification according to the present disclosure is illustrated. The method for controlling an unmanned vehicle to perform route verification includes the following steps.

Step 201, receiving to-be-verified route information sent by a cloud server in communication connection.

In the present embodiment, an executing body (for example, the control apparatus 101 shown in FIG. 1) of the method for controlling an unmanned vehicle to perform route verification may receive the to-be-verified route information sent by the cloud server through a wired connection or a wireless connection. The to-be-verified route information includes road information and expected traveling state information corresponding to a road section on a road characterized by the road information. The expected traveling state information is used to characterize an expected traveling state of the unmanned vehicle on the corresponding road section. The traveling state is used to describe the traveling speed characteristics of the unmanned vehicle.

In the present embodiment, the road characterized by the road information may be divided into a plurality of road sections. Each road section may have a corresponding expected traveling state. The expected traveling state corresponding to each road section is related to the road condition of the road section. As an example, if a road section A has a school, the expected traveling state corresponding to the road section A may be deceleration advance. As another example, if a road segment B is a right-turning road section, the expected traveling state corresponding to the road section B may be deceleration advance.

In some alternative implementations of the present embodiment, the expected traveling state may include, but is not limited to, at least one of the following items: a uniform speed advance, an acceleration advance, a deceleration advance, or a stop.

Step 202, performing following verification steps according to a set period during traveling of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information.

In the present embodiment, the executing body may control the unmanned vehicle to travel along the road characterized by the road information, and during traveling, verify the to-be-verified route information according to the set period. The set period may be a period of unit time length. For example, the set period may be a period of 5 seconds. The set period may also be a period of unit distance. For example, the set period may be a period of 10 meters. In the present embodiment, when the executing body verifies the to-be-verified route information, the following verification steps may be included.

In the first step, detecting a traveling state of the unmanned vehicle.

In the present embodiment, the traveling state may include, but is not limited to, at least one of the following items: a uniform speed advance, an acceleration advance, a deceleration advance, or a stop. In the present embodiment, the executing body may use an installed acceleration sensor to acquire the current acceleration value, thereby obtaining the current traveling state. The executing body may alternatively continuously acquire displacement values of a plurality of unit time using an installed distance sensor, thereby obtaining the current traveling state. The executing body may alternatively continuously acquire GPS (Global Positioning System) coordinate values of a plurality of unit time, thereby obtaining the current traveling state.

In the second step, determining a verification result of the to-be-verified route information, based on a matching relationship between the detected traveling state and an expected traveling state corresponding to a road section of a current location in the to-be-verified route information.

In the present embodiment, after detecting to obtain the current traveling state of the unmanned vehicle, the executing body may match the detected traveling state with the expected traveling state corresponding to the road section of the current location in the to-be-verified route information. Then, through the matching relationship between the detected traveling state and the expected traveling state, the verification result of the to-be-verified route information is determined.

In some alternative implementations of the present embodiment, the determining a verification result of the to-be-verified route information, based on a matching relationship between the detected traveling state and an expected traveling state corresponding to a road section of a current location in the to-be-verified route information includes at least one of the following: determining, in response to determining that the detected traveling state matches the expected traveling state corresponding to the road section of the current location, the to-be-verified route information being accurate; or determining, in response to determining that the detected traveling state does not match the expected traveling state corresponding to the road section of the current location, the to-be-verified route information being inaccurate.

In the present embodiment, if the detected traveling state is the same as the expected traveling state corresponding to the road section of the current location, it may be considered that the to-be-verified route information corresponding to the current section is accurate. Otherwise, if the detected traveling state is different from the expected traveling state corresponding to the road section of the current location, it may be considered that the to-be-verified route information corresponding to the current section is inaccurate.

The method provided in the present embodiment detects the traveling state of the unmanned vehicle during traveling along the road according to the set period, and determines whether the to-be-verified route information is accurate by analyzing the matching relationship between the detected traveling state and the expected traveling state, thereby improving the flexibility of verifying the accuracy of the to-be-verified route information.

Figure 3:
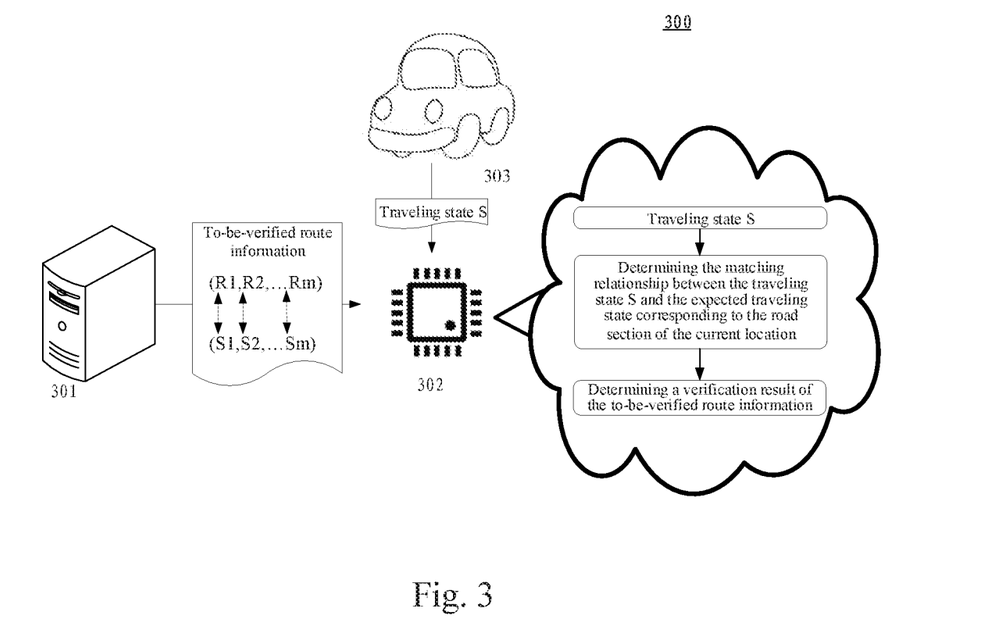
FIG. 3 is a schematic diagram of an application scenario of the method for controlling an unmanned vehicle to perform route verification according to the embodiments of the present disclosure.

With further reference to FIG. 3, which is a schematic diagram of an application scenario of the method for controlling an unmanned vehicle to perform route verification according to the an embodiment of the present disclosure. In the application scenario of FIG. 3, first, a control apparatus 302 receives to-be-verified route information sent by a cloud server 301 in communication connection. The to-be-verified route information includes road information and m pieces of expected traveling state information (S1, S2, . . . Sm) corresponding to m road sections (R1, R2, . . . Rm) on the road characterized by the road information. The expected traveling state information Sm is used to characterize the expected traveling state of the unmanned vehicle on the road section Rm. Then, during the traveling of an unmanned vehicle 303 along the road, the control apparatus 302 performs the following verification steps according to a set period: detecting a traveling state S of the unmanned vehicle 303; and determining a verification result of the to-be-verified route information, based on the matching relationship between the detected traveling state S and the expected traveling state corresponding to the road section of the current location in the to-be-verified route information.

The method for controlling an unmanned vehicle to perform route verification provided by the above embodiment of the present disclosure may receive to-be-verified route information sent by a cloud server in communication connection. Then, during traveling of the unmanned vehicle along the road, the following verification steps are performed according to a set period: detecting a traveling state of the unmanned vehicle; and determining a verification result of the to-be-verified route information, based on a matching relationship between the detected traveling state and an expected traveling state corresponding to the road section of the current location in the to-be-verified route information. The method of the present embodiment detects the traveling state of the unmanned vehicle during traveling along the road according to the set period, and determines whether the to-be-verified route information is accurate by analyzing the matching relationship between the detected traveling state and the expected traveling state, thereby improving the flexibility of verifying the accuracy of the to-be-verified route information.

Figure 4:
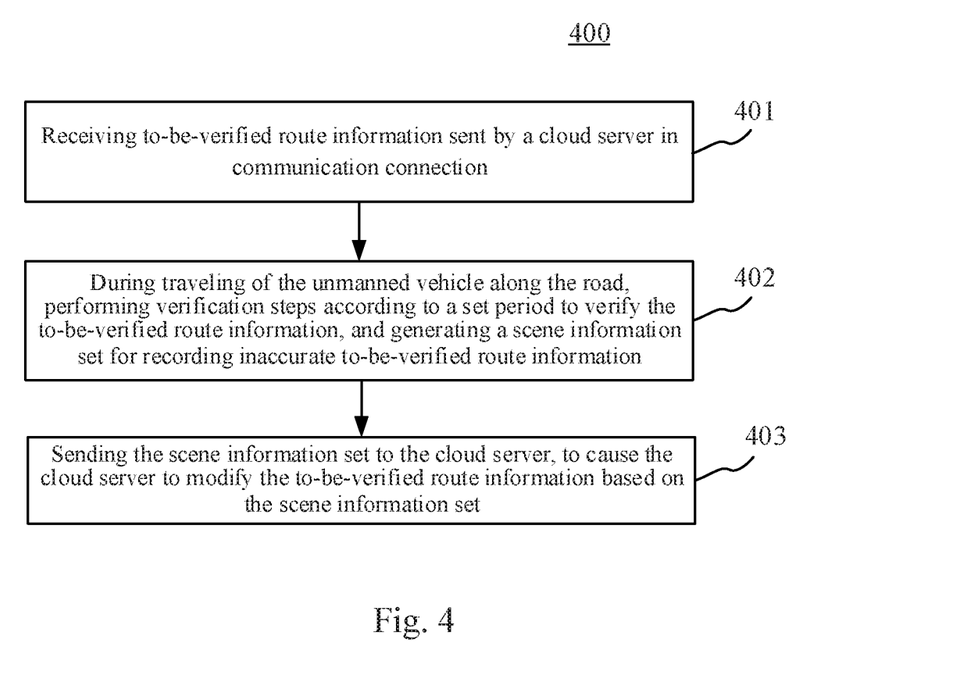
FIG. 4 is a flowchart of the method for controlling an unmanned vehicle to perform route verification according to another embodiment of the present disclosure.

With further reference to FIG. 4, a flow 400 of the method for controlling an unmanned vehicle to perform route verification according to another embodiment of the present disclosure is illustrated. The flow 400 of the method for controlling an unmanned vehicle to perform route verification includes the following steps.

Step 401, receiving to-be-verified route information sent by a cloud server in communication connection.

In the present embodiment, the specific operation of step 401 is substantially the same as the operation of step 201 in the embodiment shown in FIG. 2, and repeated description thereof will be omitted.

Step 402, during traveling of the unmanned vehicle along the road, performing verification steps according to a set period to verify the to-be-verified route information, and generating a scene information set for recording inaccurate to-be-verified route information.

In the present embodiment, when the executing body verifies the to-be-verified route information, the following verification steps may be included.

In the first step, detecting a traveling state of the unmanned vehicle.

In the present embodiment, the method for detecting the traveling state of the unmanned vehicle is substantially the same as the method for detecting the traveling state of the unmanned vehicle in step 202, and repeated description thereof will be omitted.

In the second step, determining a verification result of the to-be-verified route information, based on a matching relationship between the detected traveling state and an expected traveling state corresponding to a road section of a current location in the to-be-verified route information.

In the present embodiment, the method for determining the verification result of the to-be-verified route information is substantially the same as the method for determining the verification result of the to-be-verified route information in step 202, and repeated description thereof will be omitted.

In the third step, determining, in response to determining that the detected traveling state matches the expected traveling state corresponding to the road section of the current location, the to-be-verified route information being accurate; or determining, in response to determining that the detected traveling state does not match the expected traveling state corresponding to the road section of the current location, the to-be-verified route information being inaccurate.

In the present embodiment, if the detected traveling state of the unmanned vehicle is the same as the expected traveling state corresponding to the road section of the current location, it may be considered that the to-be-verified route information corresponding to the current section is accurate. Otherwise, if the detected traveling state of the unmanned vehicle is different from the expected traveling state corresponding to the road section of the current location, it may be considered that the to-be-verified route information corresponding to the current section is inaccurate.

In the fourth step, after the determining that the to-be-verified route information is inaccurate, determining scene information of the current location; and storing the scene information in a scene information set.

In the present embodiment, the scene information may be any information for describing the current scene. Alternatively, the scene information may include, but is not limited to, at least one of the following: current time information, current location information, or current scene image information. The executing body may collect the current scene image information using a camera. As an example, the scene image information may be image information including obstacle information, or may be image information including traffic light information. The executing body may also use the GPS coordinate value as the current location information. The executing body may also use the time currently acquired by the unmanned vehicle through the network as the current time information.

Step 403, sending the scene information set to the cloud server, to cause the cloud server to modify the to-be-verified route information based on the scene information set.

In the present embodiment, the executing body may send the scene information set to the cloud server through a wired connection or a wireless connection.

It should be noted that after receiving the scene information set, the cloud server may use the scene information set to modify the to-be-verified route information. Specifically, for each piece of scene information in the scenario information set, the cloud server may be configured to first obtain an abnormal road section having an abnormality by using the current location information in the scene information, then, determine a specified target object in the current scene image characterized by the current scene image information in the scene information using an image target recognition method. Here, the image target recognition method may be any method capable of recognizing at least one target in the image. For example, the image target recognition method may be a Support Vector Machine (SVM) method. The specified target object may be any target object that is pre-designated and has an influence on the traffic. As an example, the specified target object may be a traffic light, a building, or a sand pile that appears on the road. Finally, based on the determined target object, the to-be-verified route information corresponding to the abnormal road section is modified. The traveling state corresponding to the specified target object may be obtained by searching a preset target object-traveling state corresponding relationship table, thereby modifying the expected traveling state corresponding to the abnormal road section, and realizing the modification of the to-be-verified route information. The target object-traveling state corresponding relationship table may be a corresponding relationship table pre-defined by those skilled in the art, based on statistics on a large number of target objects and traveling states, storing the corresponding relationships between the plurality of target objects and traveling states.

In the present embodiment, the modification of the to-be-verified route information may improve the accuracy of the route (for example, the driving route of the unmanned vehicle). In addition, since the biggest factor that leads to inaccurate to-be-verified route information is that the electronic map is inaccurate, after modifying the to-be-verified route information, the cloud server may also modify the electronic map. Therefore, the operational reliability of the unmanned vehicle may be further improved.

As can be seen from FIG. 4, as compared with the embodiment corresponding to FIG. 2, the flow 400 of the method for controlling an unmanned vehicle to perform route verification in the present embodiment reflects the step of determining the scene information after determining that the to-be-verified route information is inaccurate, and the step of sending the scene information set to the cloud server, so that the cloud server modifies the to-be-verified route information based on the scene information set. Thus, the solution described in the present embodiment may facilitate correction of the to-be-verified route information, and may improve the operational reliability of the unmanned vehicle.

Figure 5:
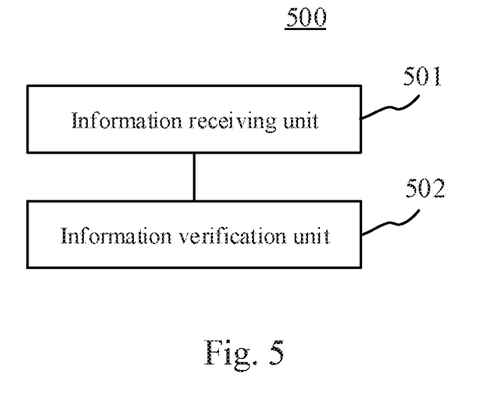
FIG. 5 is a schematic structural diagram of an apparatus for controlling an unmanned vehicle to perform route verification according to an embodiment of the present disclosure.

With further reference to FIG. 5, as an implementation of the method shown in the above figures, an embodiment of the present disclosure provides an apparatus for controlling an unmanned vehicle to perform route verification, and the apparatus embodiment corresponds to the method embodiment as shown in FIG. 2, and the apparatus may be specifically applied to various electronic devices.

As shown in FIG. 5, an apparatus 500 for controlling an unmanned vehicle to perform route verification of the present embodiment includes: an information receiving unit 501, configured to receive to-be-verified route information sent by a cloud server in communication connection, the to-be-verified route information including road information and expected traveling state information corresponding to a road section on a road characterized by the road information, and the expected traveling state information being used to characterize an expected traveling state of the unmanned vehicle on the corresponding road section; and an information verification unit 502, configured to perform the following verification steps according to a set period during traveling of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information.

In some alternative implementations of the present embodiment, the determining a verification result of the to-be-verified route information, based on a matching relationship between the detected traveling state and an expected traveling state corresponding to a road section of a current location in the to-be-verified route information may include at least one of the following: determining, in response to determining that the detected traveling state matches the expected traveling state corresponding to the road section of the current location, the to-be-verified route information being accurate; or determining, in response to determining that the detected traveling state does not match the expected traveling state corresponding to the road section of the current location, the to-be-verified route information being inaccurate.

In some alternative implementations of the present embodiment, in the verification steps, after the determining that the to-be-verified route information is inaccurate, the steps further include: determining scene information of the current location; and storing the scene information in a scene information set.

In some alternative implementations of the present embodiment, the apparatus may further include: an information sending unit (not shown in the figure). The information sending unit may be configured to send the scene information set to the cloud server, to cause the cloud server to modify the to-be-verified route information based on the scene information set.

In some alternative implementations of the present embodiment, the scene information includes at least one of the following: current time information, current location information, or current scene image information.

In some alternative implementations of the present embodiment, the expected traveling state includes at least one of the following: a uniform speed advance, an acceleration advance, a deceleration advance, or a stop.

In the apparatus provided by the above embodiment of the present disclosure, the information receiving unit 501 receives to-be-verified route information sent by a cloud server in communication connection. Then, the information verification unit 502 performs the following verification steps according to a set period during driving of the unmanned vehicle along the road: detecting a traveling state of the unmanned vehicle; and determining a verification result of the to-be-verified route information, based on a matching relationship between the detected traveling state and an expected traveling state corresponding to the road section of the current location in the to-be-verified route information. The apparatus of the present embodiment detects the traveling state of the unmanned vehicle during traveling along the road according to the set period, and determines whether the to-be-verified route information is accurate by analyzing the matching relationship between the detected traveling state and the expected traveling state, improving the flexibility of verifying the accuracy of the to-be-verified route information.

Figure 6:
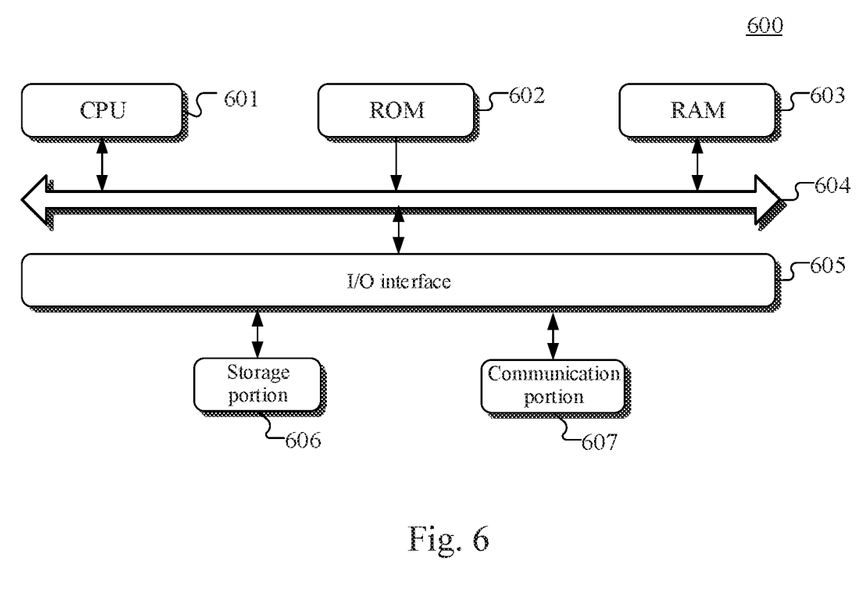
FIG. 6 is a schematic structural diagram of a computer system adapted to implement an electronic device of the embodiments of the present disclosure.

With further reference to FIG. 6, a schematic structural diagram of a computer system 600 adapted to implement an electronic device of the embodiments of the present disclosure is shown. The electronic device shown in FIG. 6 is merely an example, and should not impose any limitation on the functionality and scope of use of the embodiments of the present disclosure.

As shown in FIG. 6, the computer system 600 may include a central processing unit (CPU) 601, which may execute various appropriate actions and processes in accordance with a program stored in a read-only memory (ROM)

602 or a program loaded into a random access memory (RAM) 603 from a storage portion 606. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components may be connected to the I/O interface 605: a storage portion 606 including a hard disk and the like; and a communication portion 607 including a network interface card, such as a LAN card and a modem. The communication portion 607 performs communication processes via a network, such as the Internet.

It should be noted that the above electronic device may exist separately or may be installed in an unmanned vehicle. When the electronic device is installed in the unmanned vehicle, the above functionalities may also be integrated in the processor of the control system of the unmanned vehicle. At this time, an input portion including such as a camera, a sensor, a radar, an output portion including such as a liquid crystal display (LCD), a speaker, and a motor driver may be connected to the I/O interface 605 as needed. The motor driver may drive a mobile apparatus to complete the movement of the unmanned vehicle based on control information sent by the CPU. The driver is also connected to the I/O interface 605 as needed. A removable medium, such as a magnetic disk, an optical disk, a magneto-optical disk, and a semiconductor memory, may be installed on the driver as needed, to facilitate the retrieval of a computer program from the removable medium, and the installation thereof on the storage portion 606 as needed. Thereby, the central processing unit (CPU) 601 may control the input portion to acquire the traveling state of the unmanned vehicle from the outside, when the computer program is invoked to execute the functionality of controlling the unmanned vehicle.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 607. The computer program, when executed by the central processing unit (CPU) 601, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functionalities and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functionalities. It should also be noted that, in some alternative implementations, the functionalities denoted by the blocks may occur in a sequence different from the sequences shown in the accompanying drawings. For example, any two blocks presented in succession may be executed, substantially in parallel, or they may sometimes be in a reverse sequence, depending on the functionality involved. It should also be noted that each block in the block diagrams and/or flow charts as well as a combination of blocks may be implemented using a dedicated hardware-based system performing specified functionalities or operations, or by a combination of a dedicated hardware and computer instructions.

The units involved in the embodiments of the present disclosure may be implemented by means of software or hardware. The described units may also be provided in a processor, for example, may be described as: a processor including an information receiving unit and an information verification unit. Here, the names of these units do not in some cases constitute limitations to such units themselves. For example, the information receiving unit may also be described as "a unit configured to receive to-be-verified route information sent by a cloud server in communication connection".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive to-be-verified route information sent by a cloud server in communication connection, the to-be-verified route information including road information and expected traveling state information corresponding to a road section on a road characterized by the road information, and the expected traveling state information being used to characterize an expected traveling state of the unmanned vehicle on the corresponding road section; and perform the following verification steps according to a set period during driving of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functionalities disclosed in the present disclosure are examples.

What is claimed is:

1. A method for controlling an unmanned vehicle to perform route verification, the method comprising:
   receiving to-be-verified route information sent by a cloud server in communication connection, the to-be-verified route information comprising road information and expected traveling state information corresponding to a road section on a road characterized by the road information, and the expected traveling state information being used to characterize an expected traveling state of the unmanned vehicle on the corresponding road section, wherein the to-be-verified route information is planned based on an electronic map, and the expected traveling state is used to describe an expected traveling speed of the unmanned vehicle;
   performing following verification according to a set period during traveling of the unmanned vehicle along the road: detecting a traveling state of the unmanned vehicle; and
   determining a verification result of the to-be-verified route information, based on a matching relationship between the detected traveling state and an expected traveling state corresponding to a road section of a current location in the to-be-verified route information, wherein the determining a verification result of the to-be-verified route information, based on a matching relationship between the detected traveling state and an expected traveling state corresponding to a road section of a current location in the to-be-verified route information comprises: determining, in response to determining that the detected traveling state does not match the expected traveling state corresponding to the road section of the current location, the to-be-verified route information being inaccurate;
   determining scene information of the current location, wherein the scene information comprises at least one of: current time information, current location information, or current scene image information;
   storing the scene information in a scene information set;
   determining a control route based on the scene information set and the to-be-verified route information, wherein determining a control route based on the scene information set and the to-be-verified route information comprises: modifying the to-be-verified route information based on the scene information set and determining the control route based on the modified to-be-verified route information; and
   controlling the unmanned vehicle based on the control route, wherein controlling the unmanned vehicle based on the control route comprises: controlling the unmanned vehicle based on the modified to-be-verified route information, wherein the modified to-be-verified route information comprises a modified expected traveling speed of the unmanned vehicle.

2. The method according to claim 1, wherein the expected traveling state comprises at least one of: a uniform speed advance, an acceleration advance, a deceleration advance, or a stop.

3. An apparatus for controlling an unmanned vehicle to perform route verification, the apparatus comprising:
   at least one processor; and
   a memory storing instructions, wherein the instructions when executed by the at least one processor, cause the at least one processor to perform operations, the operations comprising:
   receiving to-be-verified route information sent by a cloud server in communication connection, the to-be-verified route information comprising road information and expected traveling state information corresponding to a road section on a road characterized by the road information, and the expected traveling state information being used to characterize an expected traveling state of the unmanned vehicle on the corresponding road section, wherein the to-be-verified route information is planned based on an electronic map, and the expected traveling state is used to describe an expected traveling speed of the unmanned vehicle;
   performing following verification according to a set period during traveling of the unmanned vehicle along the road: detecting a traveling state of the unmanned vehicle; and
   determining a verification result of the to-be-verified route information, based on a matching relationship between the detected traveling state and an expected traveling state corresponding to a road section of a current location in the to-be-verified route information, wherein the determining a verification result of the to-be-verified route information, based on a matching relationship between the detected traveling state and an expected traveling state corresponding to a road section of a current location in the to-be-verified route information comprises: determining, in response to determining that the detected traveling state does not match the expected traveling state corresponding to the road section of the current location, the to-be-verified route information being inaccurate;
   determining scene information of the current location, wherein the scene information comprises at least one of: current time information, current location information, or current scene image information;
   storing the scene information in a scene information set;
   determining a control route based on the scene information set and the to-be-verified route information, wherein determining a control route based on the scene information set and the to-be-verified route information comprises: modifying the to-be-verified route information based on the scene information set and determining the control route based on the modified to-be-verified route information; and
   controlling the unmanned vehicle based on the control route, wherein controlling the unmanned vehicle based on the control route comprises: controlling the unmanned vehicle based on the modified to-be-verified route information, wherein the modified to-be-verified route information comprises a modified expected traveling speed of the unmanned vehicle.

4. The apparatus according to claim 3, wherein the expected traveling state comprises at least one of: a uniform speed advance, an acceleration advance, a deceleration advance, or a stop.

5. A non-transitory computer readable storage medium, storing a computer program thereon, the program, when executed by a processor, cause the processor to perform operations, the operations comprising:

receiving to-be-verified route information sent by a cloud server in communication connection, the to-be-verified route information comprising road information and expected traveling state information corresponding to a road section on a road characterized by the road information, and the expected traveling state information being used to characterize an expected traveling state of the unmanned vehicle on the corresponding road section, wherein the to-be-verified route information is planned based on an electronic map, and the expected traveling state is used to describe an expected traveling speed of the unmanned vehicle;

performing following verification according to a set period during traveling of the unmanned vehicle along the road: detecting a traveling state of the unmanned vehicle; and determining a verification result of the to-be-verified route information, based on a matching relationship between the detected traveling state and an expected traveling state corresponding to a road section of a current location in the to-be-verified route information, wherein the determining a verification result of the to-be-verified route information, based on a matching relationship between the detected traveling state and an expected traveling state corresponding to a road section of a current location in the to-be-verified route information comprises: determining, in response to determining that the detected traveling state does not match the expected traveling state corresponding to the road section of the current location, the to-be-verified route information being inaccurate;

determining scene information of the current location, wherein the scene information comprises at least one of: current time information, current location information, or current scene image information;

storing the scene information in a scene information set;

determining a control route based on the scene information set and the to-be-verified route information, wherein determining a control route based on the scene information set and the to-be-verified route information comprises: modifying the to-be-verified route information based on the scene information set and determining the control route based on the modified to-be-verified route information; and controlling the unmanned vehicle based on the control route, wherein controlling the unmanned vehicle based on the control route comprises; controlling the unmanned vehicle based on the modified to-be-verified route information, wherein the modified to-be-verified route information comprises a modified expected traveling speed of the unmanned vehicle.

6. The non-transitory computer readable storage medium according to claim 5, wherein the expected traveling state comprises at least one of: a uniform speed advance, an acceleration advance, a deceleration advance, or a stop.

* * * * *